US011868240B2

(12) United States Patent
Moss

(10) Patent No.: US 11,868,240 B2
(45) Date of Patent: Jan. 9, 2024

(54) INFORMATION PROCESSING SYSTEM WITH INTELLIGENT PROGRAM SMOKE TESTING

(71) Applicant: RIMO CAPITAL LTD., London (GB)

(72) Inventor: Alon Moss, London (GB)

(73) Assignee: Rimo Capital Ltd., London (GB)

( * ) Notice: Subject to any disclaimer, the term of this patent is extended or adjusted under 35 U.S.C. 154(b) by 0 days.

(21) Appl. No.: 17/383,469

(22) Filed: Jul. 23, 2021

(65) Prior Publication Data

US 2022/0027262 A1     Jan. 27, 2022

(30) Foreign Application Priority Data

Jul. 24, 2020   (EP) ..................................... 20187804

(51) Int. Cl.
| | |
|---|---|
| *G06F 11/00* | (2006.01) |
| *G06F 11/36* | (2006.01) |
| *G06F 8/61* | (2018.01) |
| *G06F 11/30* | (2006.01) |
| *G06F 11/34* | (2006.01) |

(52) U.S. Cl.
CPC ............ *G06F 11/3688* (2013.01); *G06F 8/61* (2013.01); *G06F 11/302* (2013.01); *G06F 11/3438* (2013.01); *G06F 11/3684* (2013.01)

(58) Field of Classification Search
CPC ............... G06F 11/302; G06F 11/3438; G06F 11/3684; G06F 11/3688
See application file for complete search history.

(56) References Cited

U.S. PATENT DOCUMENTS

| | | | |
|---|---|---|---|
| 5,781,720 A | | 7/1998 | Parker et al. |
| 9,021,458 B1 | * | 4/2015 | Jacob ........................ G06F 8/60 |
| | | | 717/168 |
| 10,318,412 B1 | * | 6/2019 | McKearney, Jr. ........ G06F 8/60 |
| 2004/0060044 A1 | | 3/2004 | Das et al. |
| 2007/0028216 A1 | | 2/2007 | Boss et al. |
| 2009/0265690 A1 | | 10/2009 | Naslavsky et al. |
| 2020/0019493 A1 | * | 1/2020 | Ramakrishna ...... G06F 11/3688 |
| 2020/0351192 A1 | * | 11/2020 | Murao .................... H04L 45/74 |
| 2021/0373922 A1 | * | 12/2021 | Meier ................. G06F 11/3664 |

FOREIGN PATENT DOCUMENTS

| | | |
|---|---|---|
| CN | 104461873 A | 3/2015 |
| CN | 109979444 A | 7/2019 |
| WO | WO2020030930 A1 | 2/2020 |

OTHER PUBLICATIONS

EPO, Extended European Search Report, relating to EP application No. 20187804.8-1224, dated Dec. 16, 2020.
Applicant, Response to Extended European Search Report, relating to EP application No. 20187804.8-1224, dated Oct. 26, 2022.

* cited by examiner

*Primary Examiner* — Joshua P Lottich

(57) ABSTRACT

An information processing device comprises one or more known hardware devices including a processor and memory. An intelligent test program is provided to drive the device to develop a smoke test for a target program the name, use and functionality of which is unknown to the test program. The intelligent test program can generate a report on the functionality of the target program and can capture call back functions associated with the target program in order to automatically develop a smoke test script file for use in subsequent smoke test runs on the device.

14 Claims, 6 Drawing Sheets

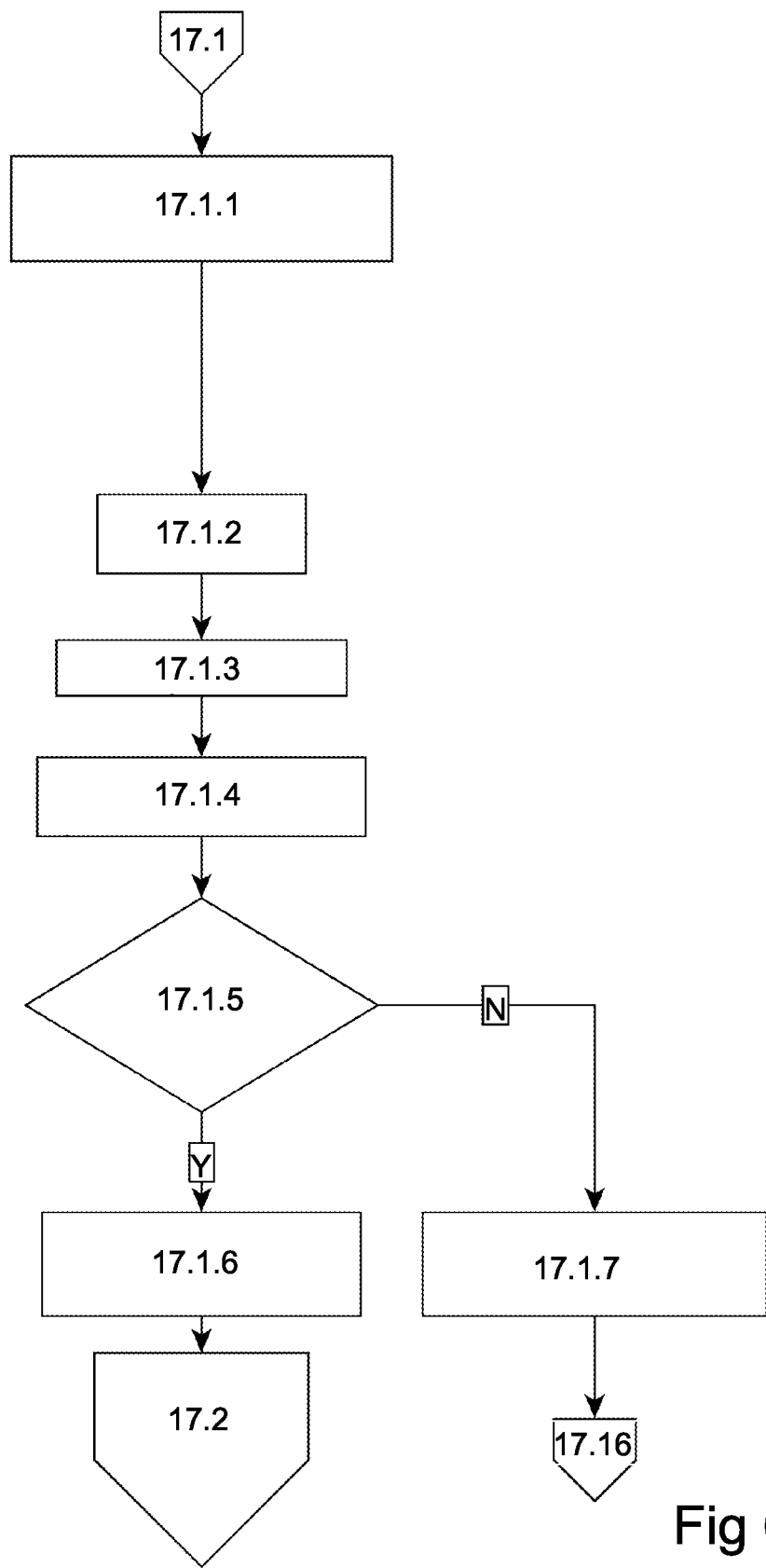

INFORMATION PROCESSING SYSTEM WITH INTELLIGENT PROGRAM SMOKE TESTING

CROSS REFERENCE TO PRIOR APPLICATION(S)

This application is a non-provisional application that claims priority to European Patent Application serial number EP20187804.8 (filed on Jul. 24, 2020) under 35 U.S.C. § 119, which is hereby incorporated by reference herein in its entirety.

TECHNICAL FIELD

The present invention relates to smoke testing a program executing in an information processing device. Smoke testing is also known as confidence testing, build verification testing, sanity testing, and build acceptance testing. A smoke test is used to test the main functionality of a program. A smoke test is generally a fairly basic test of a program and asks questions such as, does the system report that the program is installed, will the program user interface open, does the program respond to certain commands?

An information processing device at its most basic will have a central processing unit arranged to process data signals received from one or several memory modules, usually consisting of read only memory and random access memory but other memory modules may be present. The CPU outputs signals to memory and other components including a graphical processing unit (GPU) may display the output or generate sound via a sound card and loud speakers. Data input and command signals may be received via a keyboard, touch screen, pointing device, camera or microphone at least. As is well known, multiple data processing devices may be integrated into networked system in which the devices communicate over wired and/or wireless channels. It is possible to virtually emulate devices, parts or the whole of such systems in order to test the device and or system behaviour under a range of circumstances, for example a known system can be emulated as described in the applicants co-pending application WO2020030930.

A virtual or remote desktop is another commonplace tool in information processing systems well known in the art. A proprietary example is Microsoft Azure®. Such systems allow a master information processing device, in communication with a slave information processing device to control the slave via a communications network. In practice the slave device will respond to commands received from the master input devices (keyboard, pointing device, touch-screen or microphone) as if the commands were delivered directly from the corresponding slave input devices. It is well known to use such remote desktop applications to deliver support services and facilitate remote working.

For the purposes of this application the term "program" can mean either of a system program or an application. A system program is defined as one which is required to provide a platform to other software, commonly applications, it will include operating system programs and services, device drivers, and invariably provides services to other programs which cannot run without it. An application is a program which provides specific functions to the user, inexhaustive examples include: a word processor, spread sheet database, video conferencing, computer aided design, web browser and antivirus.

A simple smoke test requires a technician to "manually" install the program on an information processing system where it is to be tested. Installation commonly involves downloading an installation file and running an installation file. Alternative processes of installation include dedicated deployment servers and physical media. The technician may then check that the application appears to have installed, this can be done by inspecting a programs depository or library examples of which include: a programs folder or start menu (Windows® operating system), applications folder (OSX®), Chrome® or package manager (Linux®) or in various directories of Android®, to see if the program is listed. Other operating systems may provide different ways to confirm that an application is installed. The present invention will be described by reference to the MS Windows 10 operating system, to avoid repeating essentially similar description. The skilled person will realise that similar or at least analogous objects and processes can be found in the most commonly used operating systems running on commonly used hardware.

If the program is a system program such as a device driver the technician may inspect the driver properties in the system device manager to confirm that the driver number corresponds to the installation. If the program is an application the application should be listed in the programs depository and/or start menu. A first level smoke test is passed if the driver properties are reported as updated or the program is reported installed in the program depository. In some cases an updated system file, for example an updated OS may actually uninstall a driver or application. This will be apparent by manual inspection of the relevant device driver properties or program folder.

In a second level smoke test the technician may seek to run the program. Where the program is an application this should result in an application user interface being displayed on a device visual display unit which would indicate that the application passes the second level smoke test. For a system program the technician may run a benchmark test and record various benchmark characteristics relevant to the system program. For example if the system program is a graphical processing unit driver the test may report the operating temperature and frames per second (FPS) of the graphical processing unit while performing a standardised set of tasks. Comparison of the operating temperature and or FPS with a standard or previously recorded operating temperature or FPS will provide an indication of the performance of the graphical processing unit with the new driver. Other application resources may be monitored to indicate that a driver is; performing at all and to compare performance with a benchmark, including central processing unit performance and memory usage.

For an application an example of a third level of smoke test might involve: opening a file, editing a file and saving the file.

Running a smoke test for each program on even one system is very labour intensive and time consuming accordingly automated smoke tests are developed for critical systems which need to be frequently tested.

An automated smoke test is known in which a script file is developed by a technician to implement the test on a specified system. When the script is run the processes reported for the manually implemented test are run automatically without a requirement for the technician to be present. A report is then recorded of what programs were tested and how each program performed under test. A fault in the case of a system program might include a relative reduction in performance of the benchmark tests. For example the graphical processing unit with a newly installed driver runs less quickly than the graphical processing unit with a previously installed older driver. Writing a script file of this kind is again labour intensive, usually no less so than running manual tests, and is only worthwhile where tests are to be repeated at intervals or on many devices provided with similar system and application programs. For an application the script must include a command to run the application executable file and will need to know the full file path. The script must then move onto run functions for the specific application able to implement opening of a file. The automated test program must also include functionality to detect when the application is running and when the application responds to commands such as to open a file. The automated test is liable to fail due to changes in an updated program. For example an updated program may set automatically to a range of default settings, where the smoke test only works properly where custom settings are implemented.

An example of computer implemented method for automation testing is described in U.S. Pat. Nos. 7,568,183, 7,568,183 is primarily concerned with testing software product code under development by identifying a stage where a "lab build" of the software product code under development has changed. The lab build is run on a set of lab machines and subject to a predetermined set of tests (script files) such as described above, applied automatically to the lab build. The test results are used to generate a report on the performance of the lab build against the various automatically applied tests. This computer implemented method for automation testing nonetheless requires each test script to be manually developed in a manner which is laborious.

Many modern computer programs interface with a human operator by means of a graphical user interface or a voice user interface.

As is well known a graphical user interface is generated on a visual display unit. Regions of the graphical user interface known as icons are defined by programming the graphical user interface as responsive to a cursor. For the purpose of this specification an icon should be understood to include both pictograms, ideogram and menu commands. For these purposes an icon is simply a region of the visual display unit which implements a specific program functionality when activated by a pointing device. The cursor is driven to move to interact with the icon by means of a pointing device. Movement of the cursor may be achieved by means of a track pad, mouse, touch screen or (on a keyboard or touch screen) cursor keys, eye movements or hand movements captured via a camera or any other class of pointing device. The movement of the cursor is mediated by the operating system.

Selection of a coincident icon is achieved by a left click of the mouse or equivalent action. For the purpose of this application the term left click should be understood to be an action which implements a signal functionally equivalent to carriage return or enter. The malleability of IPD's currently allows the left click functionality to be implemented as a right click on a mouse pointing device in order to accommodate users who have a preference for the chirally alternate arrangement, eg because they are left handed. In the case of a touch screen the left click might be implemented by a single tap, double tap or a prolonged tap. Selection will result in the operating system implementing an "event handler" or "call back function" which executes a predetermined script associated with the icon by the application program developer. For example the selection might execute a menu script to open a menu of further icons.

The implementation of the function associated with a particular icon is determined by the author of the program programming the application graphical user interface before the program is deployed. Thus selection of the icon "File" in MS Word runs a script which displays a predetermined menu of icons including a "New" icon. Selection of New runs another predetermined script file which displays a selection of files which can be opened in MSWord. If a human operator were to implement a test on the program in question the human might drive the cursor to select "File" and observer if a "File" menu opens. The human operator might then select "New" and observe if a selection of icons representing files which can be opened appears.

The process of programming a graphical user interface involves associating each icon with a specific script file (the event handler or call back function) to achieve the function desired by a programmer. The graphical user interface program thus incorporates an icon register which maps each icon onto a script file.

A voice user interface operates in a manner generally similar to a graphical user interface in that when a voice "command" is matched by a voice recognition program, a specific script associated with the specific command for the application is run. For example if the command "File" is matched in MS Word a "file" menu is opened. If, while the file menu is open command "New" is matched a menu of files capable of being opened in MSWord is displayed. As with a graphical user interface the voice user interface incorporates a command register, which when programmed maps each voice command onto a specific event handler or call back function script file to achieve the functionality desired by the programmer.

It is an object of the present invention to provide an intelligent smoke test application capable of testing an unmatched program without human operator intervention whereby the labour of manually writing script files may be obviated.

SUMMARY OF INVENTION

An intelligent automated test system comprising an information processing device having a memory:
  at least one of a visual display unit with a graphical user interface or a voice user interface;
  an intelligent smoke test program recorded to the memory and
  at least one target program recorded to the memory;
  wherein said intelligent smoke test program is capable of:
  causing the target program to run;
  detecting if the target program is running;
  generating and recording a report that the target program runs;
  driving the information processing device to sweep a cursor across a graphical user interface of the target program until it interacts with a first active icon;
  implementing a command equivalent to a mouse left click to run the function script associated with the icon;
  determining if the target program is responsive to the left click;
  recording if the target program is responsive or irresponsive to the left click in a smoke test report.

Where the target program is an application, the application can be run from the "Start" menu or equivalent. The test program will be adapted to run a predetermined OS to open the start menu or equivalent as a first step. This might be achieved by driving the cursor to coincide with a start button or equivalent. The start menu is conventionally a one dimensional column or two dimensional grid of target icons each one of which represents a target program or sometimes a folder of target programs. The locations of the target program icons are determined by the OS. The test system responds to opening the start menu by guiding the cursor in a movement to coincide sequentially with each target program icon in the start menu. As the cursor reaches coincidence with an icon a target program name associated with the icon may be read from the system records. According to preloaded instructions the test program may judge whether or not the program has been flagged as already tested, or to develop and apply a smoke test to the target program or to ignore the target program and move to the next target program. If the target program is to be tested the cursor is stopped to coincide with the icon representing the target program and the test program applies a left click or equivalent command to the target program icon. This implements the call back function associated with the target application icon in the start menu causing a script to run which is intended to run the target application. This obviates the conventional requirement to write a script in order to automate running the application.

Usually many programs will be recorded in the start menu. The test program may be provided with a module to read text in the start menu and compare it to a register of previously matched and tested programs. The register of matched programs will be updated each time an unmatched program is subject to a cycle of smoke testing and a set of test program scripts is created for it. Unless the information processing device is largely a clone or copy of a previously tested device, no programs will be matched on a first cycle of testing with the test program and new test scripts will need to be developed and recorded for address in relation to each target program.

The test program may determine if a target program is matched or unmatched by comparing the program's name to the register of previously tested matched programs. Where a program is matched the matched target program name, may be used to address a pre-existing test script developed and recorded on a previous cycle by the test program.

If the application runs the application will demand system resources to read the application from the system ROM into the system RAM. The system will provide power to the system processor (CPU) for this purpose and the graphical processing unit will run, drawing power to display the target application graphical user interface on the visual display unit. The intelligent test program is adapted to capture system data, for example from the task manager or other sources, representative of one or more of the system resources. Changes in the system resource usage which synchronise with the timing of the command to run the target application will indicate that the application has or has not launched. The intelligent test program will capture the state of the system resources over the period from immediately before and after the application of the run command and save them to a smoke test report. No change or insufficient change in the system resources state will indicate a fault. Insufficient change might be indicated by the change in resource usage failing to pass a predetermined threshold value. The intelligent test program may capture other conditions such as the time for the target application graphical user interface to display or the time for the system to settle to a new steady state indicating that the target program has launched to a ready for use condition.

If the system resources indicate that the target program appears to be running and the target program graphical user interface is displayed the test program will drive the system cursor to move across the target program graphical user interface until it intersects a target program icon. The motion of the cursor may be random, or pseudo-random such that selection of the cursor may be essentially random. By pseudo-random is meant that the path of the cursor is managed so that it does not repeatedly cover the same region of the graphical user interface. This may be combined with starting the cursor movement in a specific region of the graphical user interface most likely to contain active icons. For example where a GUI is designed for users of the Roman alphabet where text is read from the top left of the page proceeding from left to right and down the page, most GUI's situate start page icons towards the top left or bottom left of the screen. The test program may be adaptable to other writing systems to start in other locations.

The test program is provided with means to detect when the cursor intersects with an icon. An exemplary means of intersect detection may include detecting a visual change in the icon, a feature commonly programmed into the graphical user interface to indicate visually that an icon is active in the context of the target program. The actual visual change may be caused by icon intersect code running on the system. The intersect detection may therefore consist of detecting a change in state of the icon intersect code which indicates the intersection. Such visual changes may include, for example; brightness, colour size or animation.

The test program is responsive to detecting an intersection of the cursor with an active icon to deliver a signal equivalent to a left click in order to run the corresponding call back function script to a smoke test memory. The system may also capture the script constituting the call back function. If the call back function runs the test program, which is monitoring the system, will detect changes to the resource usage of the system, for example, an increased demand for processor resources on the system CPU and graphical processing unit and or changes to memory usage. The test program may record the changes to the test report. The test program may record the changes quantitively as well as qualitatively, that is to say the changes may include characteristics such as the time taken for the system to reach a new state and the quantity of memory used during transition to the new state. These quantitative measures may be used to provide benchmarks for future tests of the same system. Qualitatively the test program simply reports that the system is responsive to the test or unresponsive.

The test program may drive the system to use a voice user interface instead of, or in addition to a graphical user interface. In this case the test program may apply signals corresponding to commonly used application program commands. The voice recognition service layer in such a system is commonly provided by an operating system, network or cloud based service which interacts to deliver command signals to the target program VUI, thus if a voice command is matched in any language the output command signal from the voice recognition layer may be common to all spoken languages. The test program may be capable of provoking a randomly selected output signal from the voice recognition layer to be applied to the voice user interface of the target program. Thus the test program may be configured to provoke the voice recognition service into outputting and communicating a command signal to the VUI programmed into the target program by the target program developer. If the target program is functional this will provoke a response from the target program similar to the response to left clicking an icon described above, that is to say the target grogram will respond with a call back function corresponding to the command matched, for example "file" causing a menu to open and a corresponding use of system resources. By monitoring the system resources the test program can determine if the target program is responsive. The responsiveness of the target program is recorded to the test report. As with the GUI the test program may be configured to make the system responsive to capture the script file constituting the call back function as it is run. The test program will then modify the call back function script to be run directly in subsequent tests run against the same target program on the same or other systems or devices.

The test program may be configured to test system files after installation, for example device drivers or updates to the operating system or BIOS. In this case the test program may cause the system to respond by launching one or more applications which are supported by the system program which has been installed. In the case of an update to the OS every application program is supported by the OS and the test program may be configured to launch one random application program, a random selection of application programs or each application program and to confirm the functionality of the application program or programs by a process similar to the test program process for application programs described above. The argument in such case is that the BIOS, OS or any driver is required to support the functionality of the application programs and if the application programs continue to function in response to the GUI or VUI the system programs are performing properly.

The test program may not need to be installed on the system under test. The test program may be run from a master information processing device against a slave device using a remote desktop (virtual desktop) application. Elements of the remote desktop application may be deployed on each of the master and slave system in a manner known in the art. The smoke test relies primarily on driving a system cursor to select, run and operate an application program on the slave system. Capture the call back function if required and generate a test report.

The intelligent automated test system may be run on emulations of a system instead of a real system as described in the applicant's co-pending application WO2020030930. Thus smoke tests can be developed to be run on multiple emulations of multiple systems, which may be networked systems. The performance of a new target program may be tested without risk to the real system or network. Also, by running multiple target programs simultaneously the performance of the new target program and how it affects other target programs running simultaneously on the system can be evaluated. Because the assurance/reassurance system of WO2020030930 can simultaneously test emulations of multiple devices in a network emulation the impact of a new target program on the performance of other target programs on other devices elsewhere on the network may be subject to the smoke tests developed by the intelligent smoke test system.

The intelligent smoke test system is implemented by running code in a computing system comprising at least one and possibly many processors, one or many memory components, an input device or devices and an output device or devices and other supporting hardware as is well known to the person skilled in the art. The invention may also include a package or packages of code capable of communication to a general purpose computing system adapted to implement the intelligent smoke test system.

BRIEF DESCRIPTION OF FIGURES

An embodiment of an intelligent automated test system according to the present invention will now be described, by way of example only, with reference to the accompanying illustrative figures, in which:

FIG. 5 shows the steps to identify each new application program or system program on a system and FIG. 6 illustrates a variant of the system.

DETAILED DESCRIPTION OF FIGURES

Figure 1:
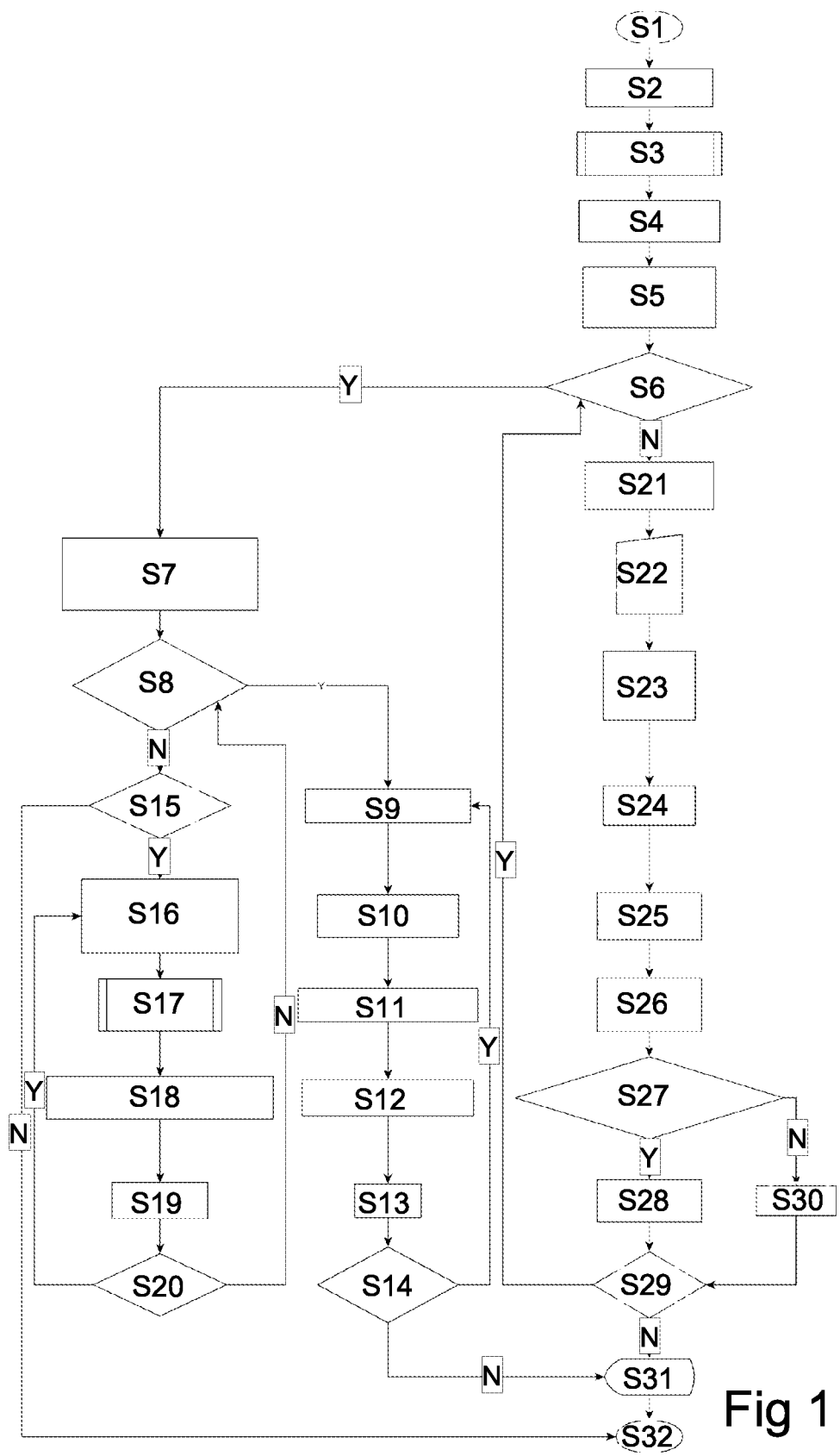
FIGS. 1 and 2 illustrate the process of the information processing device controlled by the test program.

The test program can be stored as a package of machine readable code on any suitable known storage medium such as optical disk or flash memory drive, however with current technology the package is more likely to be stored on a "disk" memory in a server communicable with an information processing device via a network, particularly a wide are network such as the internet. The package is downloaded to the information processing device and installed as an executable test program on the hard drive of the information processing device. In some cases the test program may be run from a network drive, particularly where the information processing device is part of an enterprise network of information processing device. In this case the test program is particularly useful in a system for testing large numbers of information processing devices such as the test system described in the applicant's published patent application WO2020030930A1. In the system of WO2020030930A1 at all or a substantial subset of the information processing devices forming an enterprise network are emulated in a dedicated test server situated behind a firewall of the enterprise network. A novel program or suit of programs (which may be wholly novel or a new version of an existing program) can be virtually installed into some or all of the virtual information processing devices modelled in the test server and tested in an environment which closely models the real environment including the use of a gateway which facilitates the application of security measures including security tokens to the virtual network. This enables a target program novel to the enterprise network to be tested virtually in the network by the application of tests such as a smoke test. The application of smoke tests to virtually modelled information processing devices, in the virtually modelled system, can be largely automated once smoke test script files have been developed. However, a very large number of smoke test script files may be required with a corresponding consumption of time and energy.

The test program of the present invention can be installed in a test server of WO2020030930A1, or more properly virtually installed into the virtually modelled information processing devices in the test server of the system, in order to identify novel programs and develop smoke tests to test the performance of the programs before the programs are deployed in a real working enterprise network.

The process of installing the test program into any information processing device will depend on the operating system of the information processing device and is in any event substantially conventional and known to the person skilled in the art. Generally the test program package will be downloaded and saved to a hard drive of the information processing device and an installation wizard run to implement installation. Once the test program is installed on a hard drive available to a processor of the information processing device it will conventionally be found in a folder of programs and its presence visibly indicated by an icon.

The test program will be run on the system when a novel "target" program has been installed on the information processing device. For these purposes the target program is any update to a previously installed program or a program entirely new to the information processing device. For these purposes the information processing device may be real or an emulation.

The system starts at step S1 and the target program is installed a step S2 using any appropriate process as is known to the person skilled in the art. The test program may be started automatically in response to the installation of a new software detected by the operating system or may be started manually at S3.

Figure 5:
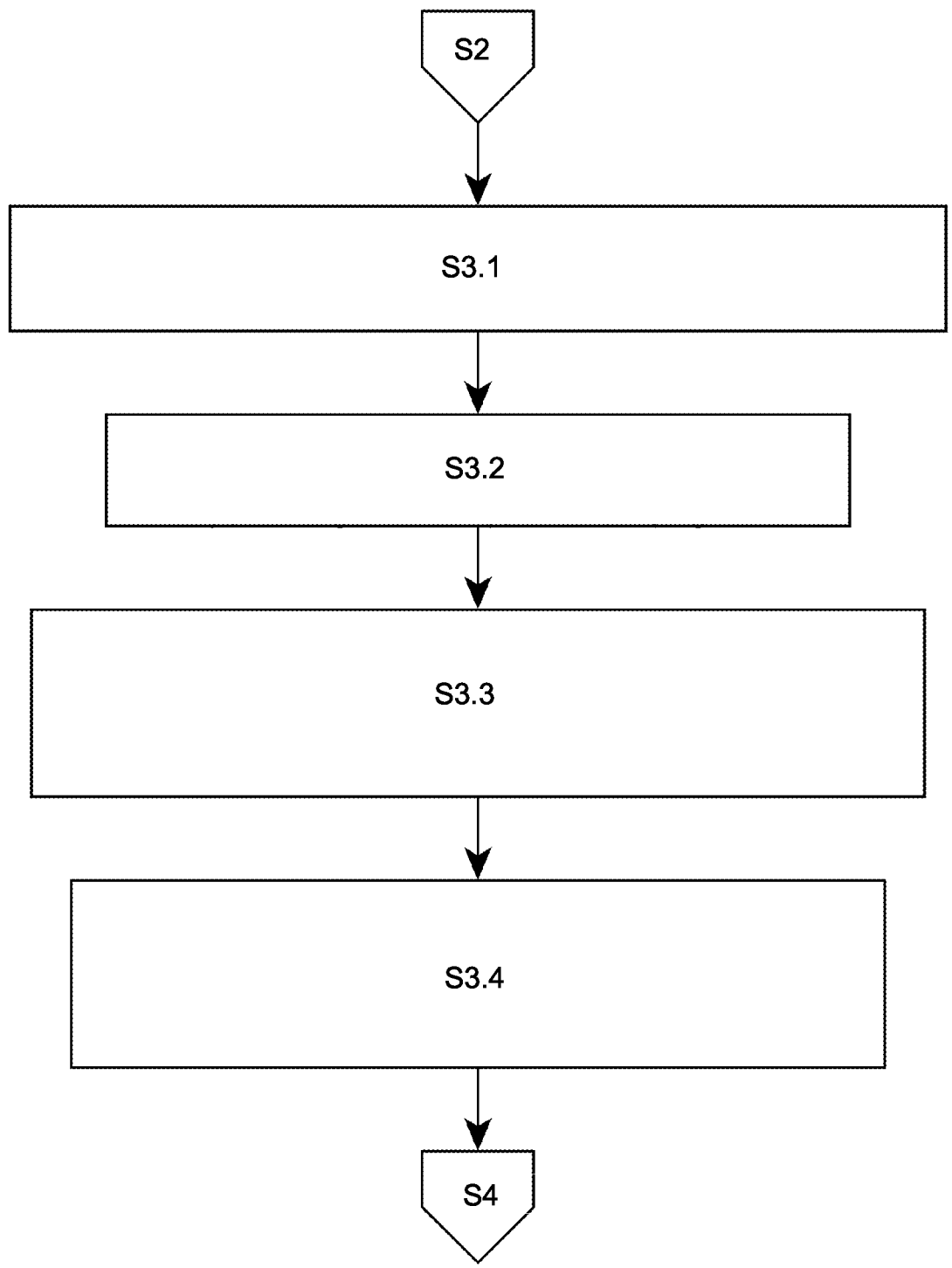

As shown in greater detail at FIG. 5 at step S3 the test program implements a discovery process by scanning the memory of the system to identify each application program file or system program file at step S3.1, at step S3.2 each identified application program file and system program file is compared with a previously established record of the application program files and system files on the system. Each unmatched application program file and system program file is flagged at step 3.3 to identify it as a target program. At step 3.4 the each flagged application program and system program is compared to a database of application and system programs to determine if it is an application program or target program. In a simplified variant of the invention the discovery process may only scan newly installed "shortcuts" or analogous address files capable of selection to run an application program. In other variants of the intelligent test program system may scan each or any of; registry keys, system settings and other files to capture the new system configuration.

At step 4 the test program flags each target program as an application program or a system program. At step 5 a first target program is selected and identified. A report document is created indexed to the selected target program.

At step 6 the system responds to the application or system program flag applied to the selected target program. Where the target program is flagged as an application program the test program goes to step 7.

At step 7 the test program drives the system to read a program depository the test program may read the application programs reported as installed in a programs depository and compare each application program to a database of previously installed programs in pursuit of a match. Where there is no matching application program in the programs folder determined at step 7 the system goes to step 8. At step 15 the test program drives the system to check that the unmatched program has not been flagged. A flag will be applied when the system has developed and run a smoke test against an unmatched application program. Where one or more unmatched and unflagged application programs are present the system selects the first unmatched program for testing at step 16 and goes to step 17 to develop a smoke test for the unknown application program.

Figure 2:
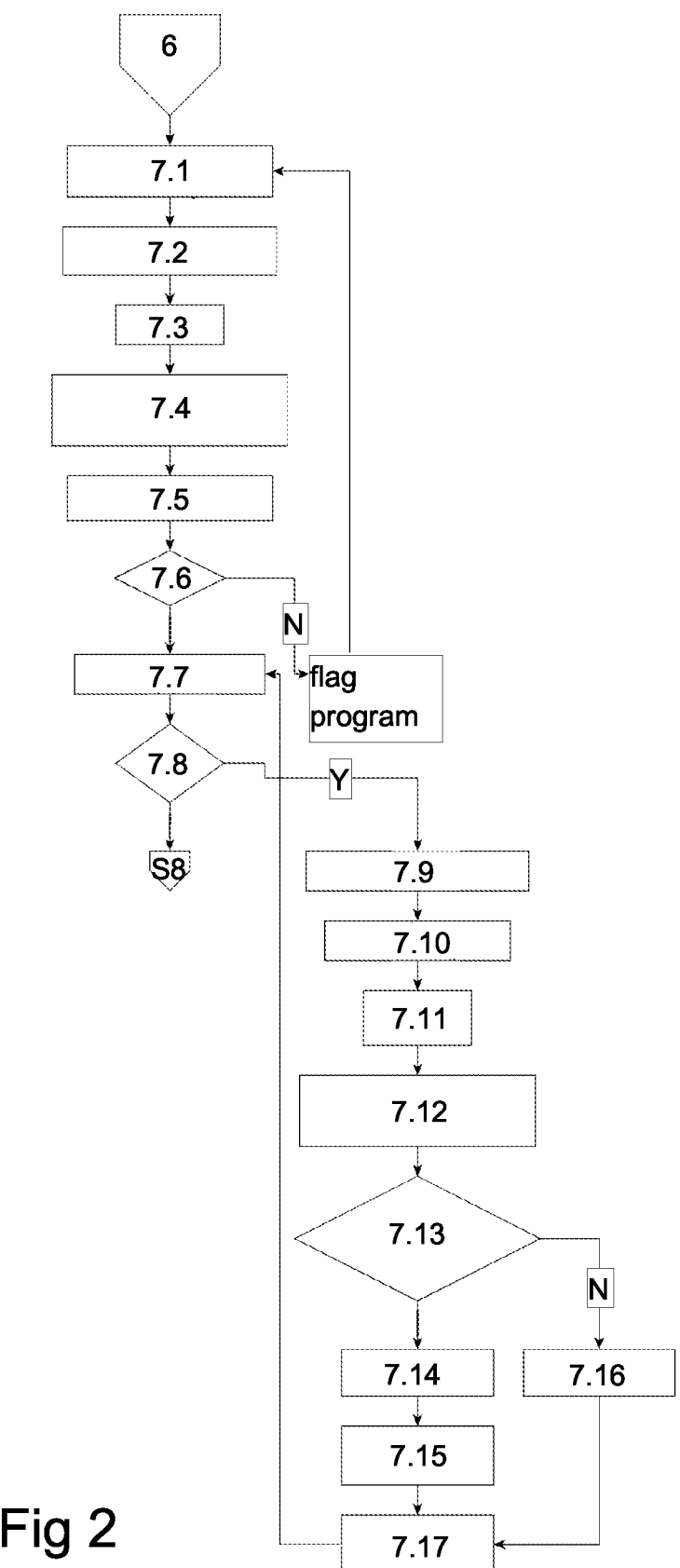
Figure 3:
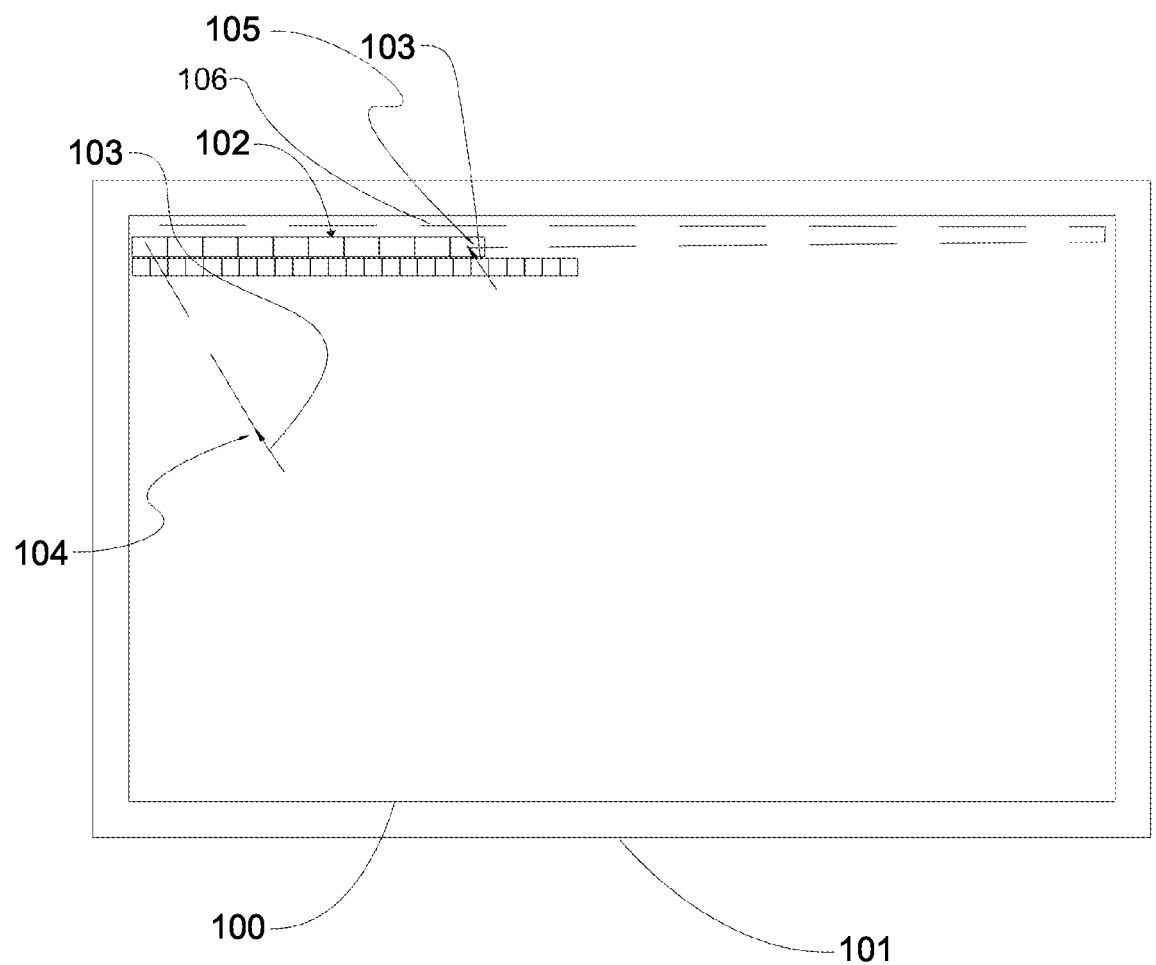
FIG. 3 illustrates a typical visual display unit displaying a target program graphical user interface.

The system will then run the intelligent smoke test sub routine illustrated by FIGS. 2 and 3.

At step 17.1 the test program is run to move the system cursor to coincide with the icon in the programs menu or start menu representing the first new program application.

At step 17.2 the test program drives the system to apply a signal equivalent to a left click to the coincident icon. This does not require the system to physically click the mouse or other pointing device only to respond as if such a physical action had occurred. The result will be for the system to apply the call back function script required to run the target application. This obviates the need for the test program to know the file path and name for the executable file of the first target program.

The test program includes a module which, at step 17.3, captures the script file forming the call back function to a register addressed by reference to the target program. This allows the test program to assemble the first part of a smoke test program script for subsequent use.

At step 17.4 the test program causes the system to monitor the system resource usage in order to sense the system response to the call back function and gain an indication of the behavior of the target program in response to the call back function. If there is no response to the call back function or comparison of the system resource usage with a predetermined expected threshold indicates that resource usage is too low, the target program is determined to have failed to run. If resource usage or the comparison indicates that the target program is above the threshold the target program is determined to be running. At step 17.5 the determination is recorded to the report.

At step 17.5 the behavior of the target program is recorded to the report as running or not running at least. If the target program runs, the actual values of characteristics such as time to complete start up, eg time for the system to settle to the new state, and memory and CPU usage is recorded to the report to provide benchmarks and/or thresholds for future test results.

At step 17.6 the test program drives the system to react to the running determination.

If the target program is determined to be running such that the graphical user interface appears the test program steps to 17.7.

FIG. 3 illustrates a typical graphical user interface 100 displayed on a visual display unit 101 with multiple icons generally shown as an array of rectangles indicated by arrow 102 and a cursor 103, at a first position 104 and at a second position 105 having moved along a path indicated by the dotted line 106. The test program checks an internal register to confirm the icon is not flagged as previously tested at step 17.8. The icon is selected randomly or pseudo randomly as the function of the coincident icon is unknown to the test program. That the icon is active is dependent on the program developer. Certain icons may be inactive unless certain other parameters are met, such as a file being open or in a predetermined state. Inactive icons could give a false negative reading on the functionality of the target program if selected.

At step 17.10 the cursor is moved along the path 106. The path may be determined by a randomly directed movement of the cursor so the path will be random until such time as the cursor intersects an active icon. However, since a random path might never intersect an active icon a pseudo-random path such as the path 106 is preferred. A pseudo random path will sweep to a region of the screen where icons are statistically most likely to be encountered, and to then sweep horizontally across the graphical user interface from left to right and to move down a predetermined distance to sweep back across the screen from right to left in order to minimize the time taken to intersect an icon and to ensure that any active icon will be intersected. If an active icon is not encountered in the first right to left sweep of the cursor the test program incrementally lowers the cursor a predetermined distance corresponding to a common size of icon and repeats the sweep until an active icon is encountered.

In the case of graphical user interface's adapted to alpha-numeric written languages not closely related to the Latin alphabet, such that the location of icons is preferentially located towards the bottom and/or right of the screen, the path 106 may be adapted to intersect icons by starting at the bottom and/or right of the screen and sweeping from bottom to top. The test program may determine the language by reading from the operating system.

When an icon is active it is commonly programmed to appear differently to an inactive icon, or to respond to the intersection of the cursor by changing its appearance. This enables the test program to determine whether or not an intersected icon is active and respond by selecting an active icon and ignoring an inactive icon.

When an active icon is intersected by the cursor 103 at position 105 the test program responds by halting the motion of the cursor.

At step 17.11 the test program responds to intersection of an unflagged active icon and halting the cursor by applying a signal equivalent to the left click of a mouse to the intersected icon. If the target program is running correctly the result is the target program calls a script file (ie the call back function), programmed into the graphical user interface by the test program developer. The call back function implements the functionality associated with the icon as it runs.

At step 17.12 the test program monitors the system resource usage such as CPU, GPU, ROM, RAM, display and/or network activity usage to determine if the test program is responsive to running the call back function. The responsiveness of the test program is judged at step 17.13. At step 17.13 the values of sensed system resource changes are compared to a, or multiple predetermined threshold values. Thus if the change in resource usage falls above or below the predetermined threshold change values the target program is determined to be responsive or not responsive to the left click.

Where the test program is judged qualitatively responsive to the icon/call back function this is recorded to a test report at step 17.14. The degree of responsiveness may also be quantitatively captured and recorded at step 17.14 by reporting the levels of CPU, graphical processing unit, ROM or RAM deployed to implement the function. The resource usage values may then be used to benchmark the target program in the system for subsequent runs of the smoke test. If the call back function is judged not to have run at step 17.13 the test program reports the program as unresponsive at step 17.17.

From step 17.15 or 7.17 the program goes to step 7.16 where the icon is flagged.

From step 7.16 the test program returns to step 17.7 which repeats the icon test program by finding the next unflagged icon by means of pseudo random movement of the cursor until all the icons are flagged. At this stage the test program goes to step 18.

At step S18 the test program records the addresses for script files or actual script files associated with the first unflagged program to a register or database. At step 19 the test program flags the first target program as tested, closes the first target program and moves to step S20.

The test program will adapt the script files captured during the above described process to enable the script files to run as a smoke test when the application target program is subsequently identified as the intelligent smoke test is run at a later date.

If the script file smoke tests developed by the

At step S20 the test program inspects the program depository for any remaining unflagged and unmatched target application programs. If there are any remaining unflagged unmatched target allocation programs the test program goes to step S16 and proceeds to test the remaining first unmatched target program using the process described above.

If no unmatched unflagged programs are found the test program goes to step S8 and then to step S9 were the first matched program is selected. The test program proceeds to step S10 where the name of the selected test program is used to address a previously recorded set of test scripts, developed using the procedure illustrated in FIG. 2 to be appropriate to the target program.

At step S11 the addressed selected smoke test scripts are run in order to produce a smoke test report at S12. At step S13 the target program is flagged as tested and goes to step S14.

At step S14 the test program checks for any remaining unflagged matched programs and if any are present goes to step S9.

If there are no unflagged matched programs the test program goes to step S31 where the reports may be displayed or saved for subsequent inspection by a technician.

If no matched programs remain unflagged the program ends at step 17.

If the target program is identified as a system program (not an application program) at S6 the test program goes to step S21 where the operator is required to input the class of system program to be tested, in this case classes may be exemplified by system programs such as a GPU driver, sound card driver, WiFi® card driver, Bluetooth® printer driver or operating system which is input to the system test program at step S22. In response to the input a step S22 the test program selects an application test program to test the performance of the new system program and runs the selected program or programs at step S24. The application test program may be a purpose developed program or any of the application programs installed to the system which are selected because they depend on support from the respective system target program. If the application test program passes the smoke test when subject to either of the procedures defined by the loops at S9 to S20 the system program is deemed to have passed the smoke test.

Figure 4:
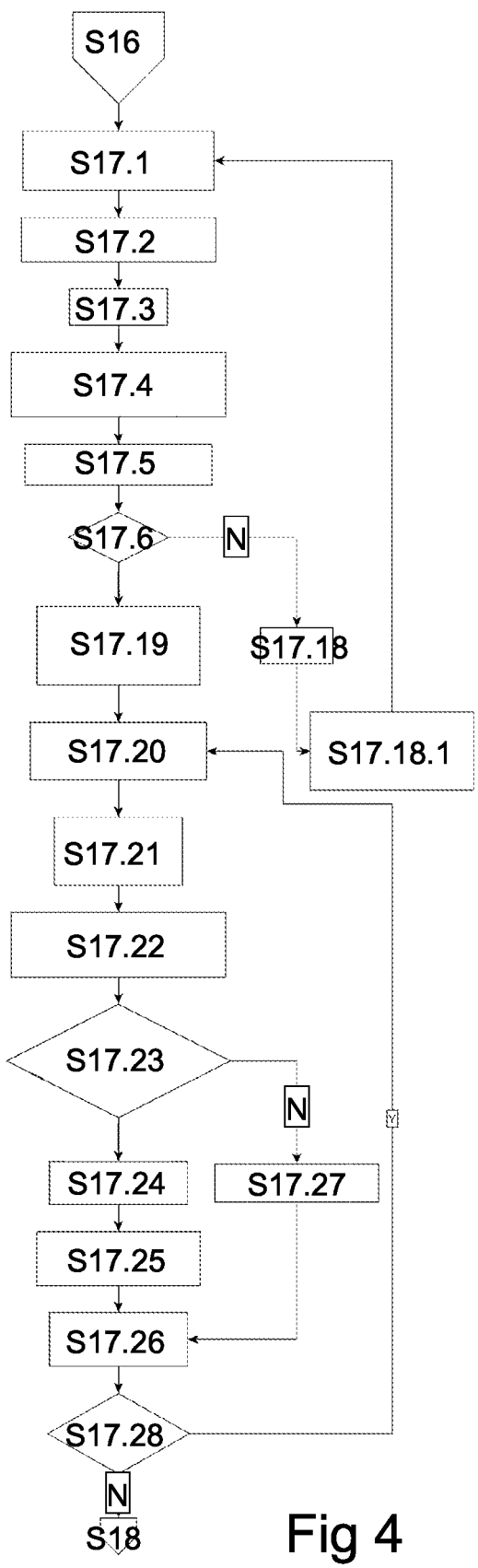
FIG. 4 is a variant of the system.

FIG. 4 illustrates a variant of the test program of FIG. 2 in which a voice user interface is used to implement a smoke test and develop a smoke test script. The integers of the variant common to FIG. 2 are similarly enumerated.

If at step 17.6 it is determined from the behaviour of the system resources that the target program is running the test program reports that the target starts at step 17.19. At step 17.20 the program selects a common voice command from a library of commonly used voice commands. At step 17.21 a signal corresponding to the selected commonly used voice command is applied to the voice user interface of the target program. At step 17.22 the system resources, such as CPU GPU, RAM and ROM usage are monitored for a period from just before the command signal is applied. If the resource usage exceeds a predetermined threshold value at 17.23 the target program is determined not to have responded to the command. In this case the responsive behaviour is recorded to the test report at step 17.24. At step 17.25 the call back function implemented by the responsive command is captured to generate a script file for use in subsequent smoke tests. If the target program fails to cause resources to exceed the threshold value or values, the target program is reported is unresponsive at step S17.27. After steps 17.25 or 17.26 the program goes to step 17.27 where the command is flagged in the library. At subsequent step S17.28 the test program inspects the library of commands to determine if any remain unchecked. If any remain unchecked the test program goes to step 17.20. If there are no unchecked commands the program goes to step S18 corresponding to step S18 in FIG. 1.

FIG. 6 illustrates a variant of the invention in which between steps 17.1 and 17.2 steps 17.1.1 to 17.1.18 are implemented. A report document is established indexed to the target program at step 17.1.1. A signal equivalent to a right click of a pointing device is applied at step 17.1.2 to the intersected icon in order to open a context menu. If the context menu opens it will use system resources which are monitored at step 17.1.3. At steps 17.1.4 the system resource usage is compared to predetermined threshold values of resource usage. At 17.1.5 the system judges if the system resource usage exceeds the threshold value. If the system resource usage exceeds the threshold value the result is reported to the document at step 17.1.6 and the system proceeds to step 17.2 in FIG. 2. If the result is less than the threshold value the system responds by recording the result to the report document at step 17.1.7 and proceeding to step 17.16 in FIG. 2.

SCHEDULE OF DRAWING INTEGERS

FIG. 1
S1 Start
S2 install target program
S3 run test program to find any new target programs
S4 flag each application program
S5 select a first application program or system program
S6 is the target program an application program
S7 read installed application programs and compare read installed application programs to programs recorded from any previous run
S8 are any installed programs matched to previously tested programs
S9 select first/next unflagged matched program
S10 address automated test for corresponding matched program
S11 run addressed tests against program
S12 generate test reports for each tested program
S13 flag programs tested
S14 any unflagged matched programs?
S15 are there any unflagged unmatched programs?
S16 select first unmatched program
S17 run intelligent smoke test
S18 record script file of tests addressed to select program
S19 flag tested program
S20 any unflagged unmatched programs?
S21 what class of system program
S22 user inputs or selects the class of system program
S23 test program selects an application to test the performance of the class of system program
S24 run selected application
S25 monitor system resources deployed when the selected application runs
S26 compare the system resources used with a benchmark
S27 does the selected application resource use perform well in comparison to the benchmark
S28 record pass report
S29 any more target programs?
S30 record fail report
S31 display reports
S32 end
FIG. 2
7.1 move the cursor through the programs folder menu to the first unflagged and unmatched program
7.2 apply left click to the first unmatched program
7.3 capture call back function script
7.4 monitor system resource (eg the activity of the CPU, GPU, RAM, display and ROM for indications that the selected unmatched program is running
7.5 report program launches or fails to launch
7.6 program running?
7.7 identify active icon of program GUI
7.8 are there any unflagged active icons
7.9 randomly select an unflagged active region
7.10 drive system cursor to coincidence with the selected region
7.11 apply left click to the selected region
7.12 monitor system resources (eg the activity of the CPU, GPU, RAM, ROM display and network activity for indications that the selected unmatched program is running
7.13 were system resources used by the program in response to the left click?
7.14 report responsive to left click
7.15 record actions as a script file addressed by the program
7.16 report responsive to left click report unresponsive to left click
7.17 flag the icon
FIG. 3
100 graphical user interface
101 visual display unit
102 rectangles
103 cursor
104 first position
105 second position
106 path
FIG. 4
S17.1 move the cursor through the programs folder menu to the first unflagged and unmatched program
S17.2 apply left click to the first unmatched program
S17.3 capture call back function scrip
S17.4 monitor system resource (eg the activity of the CPU, GPU, RAM and ROM for indications that the selected unmatched program is running
S17.5 report program launches or fails to launch
S17.6 program running?
S17.18 flag program
S17.18.1 report that the program does not start
S17.19 report that the program starts
S17.20 randomly select an unflagged common voice command from library
S17.21 apply a signal corresponding to the selected voice command to the application program VUI
S17.22 monitor system resources (eg the activity of the CPU, GPU, RAM and ROM for indications that the selected unmatched program is running
S17.23 were system resources used by the program in response to the voice command signal
S17.24 report responsive to voice command
S17.25 record the call back function as a smoke test script file addressed by reference to the program
S17.26 flag the command
S17.27 report unresponsive to the command
S17.28 are there any unflagged voice commands?
FIG. 5
S3.1 scan the system memory for application program, system program files
S3.2 compare the application and program files found at S3.1 to any pre-existing record of application, or program files S3.3 flag each application program file or system program file found at S3.1 and unmatched at S3.2 as a target program S3.4 compare each flagged application program or system program as an application program or a system program by matching the application program or system program filename to a database of filenames

FIG. 6

17.1.1 establish target program report document
17.1.2 right click to open context menu
17.1.3 monitor system resources
17.1.4 compare system resource usage to predetermined threshold value
17.1.5 does system resource usage exceed threshold
17.1.6 report target application passed in document
17.1.7 report target application failed in document

The invention claimed is:

1. An intelligent automated smoke test system for an information processing device having a memory comprising:
an information processing device;
an intelligent smoke test program recorded to the memory so that the information processing device is responsive to the attempted installation of any new target program;
wherein the information processing device, when executing instructions of the intelligent test program, is responsive to the intelligent smoke test program to:
scan each application program file and system program file recorded to the memory;
compare each application program file and system program file and any system configuration settings to a previously established record of application program files system program files and system configuration settings;
identify each unmatched application program file and system program file as a target file by applying a flag;
said system responsive to identification of an unmatched application program file or system program file to report a target program as installed and to record the presence of a novel unmatched target program to the intelligent smoke test program in a report, or to report the absence of any novel target program;
wherein a first level smoke test is automatically developed to test a performance of an unknown target program installed to the device.

2. An intelligent smoke test system according to claim 1 wherein:
installation of an application program causes an icon to be established in a program depository;
the information processing device is responsive to the execution of the intelligent smoke test program to:
respond to the presence of the flagged application program to run the unknown target application program by driving a cursor to coincidence with the icon representing the unknown target application program and
implement a signal equivalent to a left mouse click in order to implement the call back function programmed into the graphical user interface associated with the unknown target application program icon, and
monitor the information processing device system resources to determine if the unknown target program is responsive to the left click.

3. An intelligent automated test system according to claim 2 wherein the target program is judged to be responsive if the system resources monitored over a period of time meet or exceed a predetermined threshold value or values.

4. An intelligent automated test system according to claim 3 wherein: when the target program is determined to be responsive to the left click the intelligent test program captures the call back function implemented by the left click for use in developing a script file capable of being run on the system to smoke test the target program in a subsequent test procedure.

5. An intelligent automated smoke test system according to claim 4 wherein the system is responsive to the intelligent smoke test program to create a register of known target programs for which test scripts have been developed, whereby, on running the intelligent smoke test program each program in the register can be compared to each program recorded into a programs folder, to determine if a program is matched in the register and therefore known or unmatched and therefore novel.

6. An intelligent automated smoke test system according to claim 3 wherein the information processing device is responsive to the intelligent smoke test program to record the quantities of system resources used in response to the signal equivalent to a left mouse click for use as a new predetermined threshold for subsequent tests.

7. An intelligent automated test system according to claim 1 wherein each flagged target program is identified as one of an application program or a system program and further flagged accordingly.

8. An intelligent automated smoke test system according to claim 7 wherein the information processing device is responsive to:
the intelligent smoke test program reporting that the target program has started and deployed a graphical user interface to drive a cursor to move along a random or pseudo-random path on the graphical user interface;
intersection of the cursor with an active icon of the graphical user interface to stop the movement of the cursor;
application of a signal equivalent to a mouse left click to implement the call back function associated with the specific icon;
monitoring the system resources in reaction to the left click signal to determine if the target program is responsive to the left click;
reacting to the determination of the responsiveness of the target program to record that the target program graphical user interface is responsive, or is not responsive, to a report.

9. An intelligent automated test system according to claim 8 wherein the determination of responsiveness of the target program is determined by comparing the monitored system resource usage to a predetermined threshold value.

10. An intelligent automated smoke test system according to claim 8 wherein:
the system is responsive to the intelligent smoke test program to capture the call back function associated with the activate icon;
to adapt the call back function to form a script file;
to record the script file to a register addressed by reference to the intelligent smoke test program whereby the script file can be used to test the now known program in subsequent cycles of testing.

11. An intelligent automated smoke test system according to claim 1 wherein the information processing device is responsive to the intelligent smoke test program to record the qualitative response of the target program as—started—or—did not start—to a report.

12. An intelligent automated smoke test system according to claim 1 wherein the target program is responsive to a voice user interface;
   said system is responsive to a determination that the target program is running to select a voice command from a library of voice commands;
   said system responsive to the intelligent smoke test program to apply a signal corresponding to the voice command to the target program;
   said system monitoring system resources from a period before application of the voice command signal and comparing a change in the resource usage to a threshold value or threshold values in order to determine if the target program is responsive to the voice command signal;
   said system responsive to a determination to record the determination to a report.

13. An intelligent automated smoke test system according to claim 12 wherein the system responds to a determination to flag the tested voice command and to select an unflagged voice command from the library or if there are no unflagged voice commands to end the test process on the selected target program.

14. An intelligent automated smoke test system according to claim 1 wherein a system program is tested by identifying the class of the system program;
   selecting an application program requiring support from the system program installed;
   running the intelligent smoke test on the selected application program, wherein the system program is determined to be, respectively, functional or dis-functional if the selected application program is determined to be functional or dis-functional; and reporting the determination.

* * * * *